US010005567B2

(12) United States Patent
Hache et al.

(10) Patent No.: US 10,005,567 B2
(45) Date of Patent: Jun. 26, 2018

(54) METHOD FOR STATIONING A SATELLITE AND IN-ORBIT TESTING OF ITS PAYLOAD

(71) Applicant: THALES, Courbevoie (FR)

(72) Inventors: Raphaël Hache, Cannes la Bocca (FR); Alexandre Kaltenbach, Cannes la Bocca (FR); Stéphane Tessandori, Cannes la Bocca (FR)

(73) Assignee: THALES, Courbevoie (FR)

( * ) Notice: Subject to any disclaimer, the term of this patent is extended or adjusted under 35 U.S.C. 154(b) by 193 days.

(21) Appl. No.: 14/808,897

(22) Filed: Jul. 24, 2015

(65) Prior Publication Data

US 2016/0023780 A1 Jan. 28, 2016

(30) Foreign Application Priority Data

Jul. 25, 2014 (FR) ...................................... 14 01713

(51) Int. Cl.
| | |
|---|---|
| *B64G 1/00* | (2006.01) |
| *B64G 1/10* | (2006.01) |
| *B64G 1/24* | (2006.01) |
| *B64G 1/26* | (2006.01) |
| *B64G 1/40* | (2006.01) |

(52) U.S. Cl.
CPC ........... *B64G 1/007* (2013.01); *B64G 1/1007* (2013.01); *B64G 1/242* (2013.01); *B64G 1/26* (2013.01); *B64G 1/40* (2013.01); *B64G 1/405* (2013.01)

(58) Field of Classification Search
CPC ....... B64G 1/007; B64G 1/1007; B64G 1/242
See application file for complete search history.

(56) References Cited

U.S. PATENT DOCUMENTS

| | | | | |
|---|---|---|---|---|
| 4,707,699 A | * | 11/1987 | Toellner ................... | H01Q 1/04 342/352 |
| 5,067,672 A | * | 11/1991 | Bouzat ................... | B64G 1/007 244/158.5 |
| 5,186,419 A | * | 2/1993 | Scott ...................... | B64G 1/007 244/164 |
| 5,595,360 A | * | 1/1997 | Spitzer ................... | B64G 1/007 244/158.5 |

(Continued)

FOREIGN PATENT DOCUMENTS

| | | |
|---|---|---|
| EP | 1 059 232 A2 | 12/2000 |
| WO | 2012/040828 A1 | 4/2012 |

OTHER PUBLICATIONS

Davis, Jason; "How to get a satellite to geostationary orbit"; Jan. 17, 2014; The Planetary Society; <http://www.planetary.org/blogs/jason-davis/20140116-how-to-get-a-satellite-to-gto.html>.*

(Continued)

*Primary Examiner* — Tien Q Dinh
*Assistant Examiner* — Michael A. Fabula
(74) *Attorney, Agent, or Firm* — Baker & Hostetler LLP

(57) ABSTRACT

A method for stationing a satellite comprises a transfer phase, during which the satellite moves on an elliptical geosynchronous orbit, the orbit being deformed progressively by application of a thrust by electrical or hybrid electrical-chemical propulsion to bring it closer to a geostationary orbit. The transfer step comprises a substep during which, during a plurality of revolutions of the satellite, the thrust is stopped for a fraction of orbital period and tests of a telecommunications payload of the satellite are performed in the absence of thrust.

10 Claims, 2 Drawing Sheets

(56) References Cited

U.S. PATENT DOCUMENTS

| | | | |
|---|---|---|---|
| 5,681,011 A * | 10/1997 | Frazier | B64G 1/242 244/158.5 |
| 5,934,621 A * | 8/1999 | Kent | B64G 1/007 244/135 R |
| 6,116,543 A * | 9/2000 | Koppel | B64G 1/002 244/158.5 |
| 6,182,928 B1 * | 2/2001 | Wagner | B64G 1/007 244/158.5 |
| 6,305,646 B1 * | 10/2001 | McAllister | B64G 1/242 244/158.8 |
| 6,341,749 B1 | 1/2002 | Ocampo | |
| 6,543,723 B1 * | 4/2003 | Oh | B64G 1/007 244/158.5 |
| 6,701,126 B1 * | 3/2004 | Draim | B64G 1/1085 455/12.1 |
| 7,113,851 B1 * | 9/2006 | Gelon | B64G 1/007 244/158.5 |
| 8,457,810 B1 | 6/2013 | Batla et al. | |
| 8,763,957 B1 * | 7/2014 | Higham | B64G 1/007 244/158.6 |
| 2002/0132577 A1 * | 9/2002 | Draim | H04B 7/195 455/12.1 |
| 2002/0177403 A1 * | 11/2002 | LaPrade | H04B 7/195 455/12.1 |
| 2003/0062452 A1 * | 4/2003 | Oh | B64G 1/007 244/158.5 |
| 2005/0133671 A1 | 6/2005 | Wang et al. | |
| 2008/0105788 A1 * | 5/2008 | Anzel | B64G 1/26 244/169 |
| 2010/0321263 A1 * | 12/2010 | Bosshard | H01Q 3/20 343/757 |
| 2012/0075149 A1 * | 3/2012 | Palacin | H01Q 25/007 343/711 |
| 2012/0252356 A1 * | 10/2012 | Lance | H04B 7/2041 455/12.1 |
| 2014/0073239 A1 * | 3/2014 | Tessandori | H04B 7/18519 455/9 |
| 2015/0197350 A1 * | 7/2015 | Ho | B64G 1/242 244/158.4 |
| 2016/0131737 A1 * | 5/2016 | Aymes | B64G 3/00 342/357.2 |

OTHER PUBLICATIONS

Pocha, J.J.; An Introduction to Mission Design for Geostationary Satellites; 1987; D.Reidel Publishing Co; Chapter 4: The Apogee Manoeuvre; pp. 51-66 (Year: 1987).*

* cited by examiner

METHOD FOR STATIONING A SATELLITE AND IN-ORBIT TESTING OF ITS PAYLOAD

CROSS-REFERENCE TO RELATED APPLICATION

This application claims priority to foreign French patent application No. FR 1401713, filed on Jul. 25, 2014, the disclosure of which is incorporated by reference in its entirety.

FIELD OF THE INVENTION

The invention relates to a method for stationing a satellite, including a step of in-orbit testing of its payload. The invention applies in particular to geostationary telecommunications satellites.

BACKGROUND

After their launch, telecommunications satellites have to be positioned on their operational orbit—often of geostationary type—and tested in orbit before being able to be handed over to the telecommunications operator who has ordered them after a final in-orbit acceptance review (IOAR).

Conventionally, the method proceeds as follows. First of all, a launcher injects the satellite onto a very elliptical and inclined transfer orbit. The transfer onto geostationary orbit (GEO) is done by chemical propulsion: typically three thrusts each of one hour, over one week. The transfer manoeuvres are generally performed in such a way that the satellite arrives on the GEO orbit at a longitude different from the final longitude, so as not to interfere with the operational satellites—particularly in the case where the satellite to be tested is intended to replace, without any service interruption, a satellite that has to be decommissioned. The in-orbit testing (IOT) is performed in these conditions; they typically last two weeks. Then, the satellite is diverted to reposition it at its final longitude, which takes another few days, even a week or more. In total, a period of between three weeks and more than a month has to be counted between the launch and the IOAR.

By way of example, document WO 2012/040828, which proposes a platform calibration operation before the transfer phase, then an activation and verification of the payload after the satellite has reached its final position.

There is a tendency to replace, wholly or partly, the chemical propulsion of the satellites by electrical propulsion, which has the particular feature of producing a weak thrust (of the order of 1 N or less) with high specific impulse. See for example documents U.S. Pat. No. 5,595,360 and U.S. Pat. No. 8,457,810. The benefit of this approach is that it allows for a significant reduction of the weight of the satellite, and therefore of the launch cost. However, it also leads to a considerable lengthening of the transfer phase, which can take between 3 and 6 months for an entirely electrical propulsion (compared to approximately a week in the case of chemical propulsion), to which approximately another month would have to be added for the IOT and the repositioning on GEO orbit.

Document U.S. Pat. No. 6,341,749 describes a method for stationing a satellite with electrical propulsion, in which the orbital transfer period comprises phases without propulsion which are used to perform earth acquisition and attitude calibration operations, but not payload operations.

SUMMARY OF THE INVENTION

The invention aims to reduce the time interval between the launch and the IOAR of a geostationary satellite bearing a telecommunications payload and using, for its stationing, an electrical or hybrid chemical-electrical propulsion.

According to the invention, this aim is achieved by modifying the transfer phase of the satellite such that the IOTs can be performed during this phase, before the satellite reaches the geostationary orbit. The modified transfer trajectory is not optimal (its duration is increased by a few days compared to an optimal case), but this makes it possible to perform the IOTs "in concurrent operation time" and avoid the repositioning phase.

One object of the invention is therefore a method for stationing a satellite comprising a transfer phase, during which said satellite moves on an elliptical geosynchronous orbit, said orbit being deformed progressively by electrical or hybrid electrical-chemical propulsion to bring it closer to a geostationary orbit, characterized in that said transfer step comprises a substep during which, during a plurality of revolutions of the satellite, said thrust is stopped for a fraction of orbital period and tests of a telecommunications payload of said satellite are performed in the absence of thrust.

The method can, in particular, comprise the following steps:

a) using a launcher, injecting said satellite onto a sub-geosynchronous transfer orbit, elliptical and inclined relative to an equatorial plane;

b) bringing said satellite onto said geosynchronous elliptical orbit, inclined relative to said equatorial plane; and c) by electrical or hybrid electrical-chemical propulsion, applying to said satellite a thrust—that can be described as "continuous"—suitable for progressively bringing said inclined geosynchronous elliptical orbit closer to a geostationary orbit;

and said step c) can comprise said substep c'), during which, during a plurality of revolutions of the satellite, said thrust is stopped for a fraction of orbital period and said tests of a telecommunications payload of said satellite are performed in the absence of thrust.

According to different embodiments of such a method:

Said transfer orbit can be a geostationary transfer orbit.

Said step b) can comprise the application of a thrust suitable for increasing the altitude of the apogee and of the perigee of the orbit of said satellite.

Said geosynchronous orbit can be elliptical with its greater axis on said equatorial plane and, during said substep c', said payload tests can be performed in fractions of orbital period during which the satellite is furthest away from said equatorial plane.

During said step c), a thrust can be applied to said satellite that is suitable for increasing the altitude of its perigee and lowering that of its apogee.

During said step c), a thrust can be applied to said satellite that is suitable for progressively reducing the inclination of its orbit relative to said equatorial plane.

During said substep c', said satellite can move on a geosynchronous orbit exhibiting an inclination of at least 5°, and preferably between 5° and 20°, relative to said equatorial plane.

The method can also comprise the following step:

d) positioning said satellite on said geostationary orbit.

Said satellite can be a telecommunications satellite with all-electrical propulsion or with hybrid chemical-electrical propulsion.

BRIEF DESCRIPTION OF THE DRAWINGS

Other features, details and advantages of the invention will emerge from reading the description given with reference to the attached drawings given by way of example and which represent, respectively.

DETAILED DESCRIPTION

Figure 1:
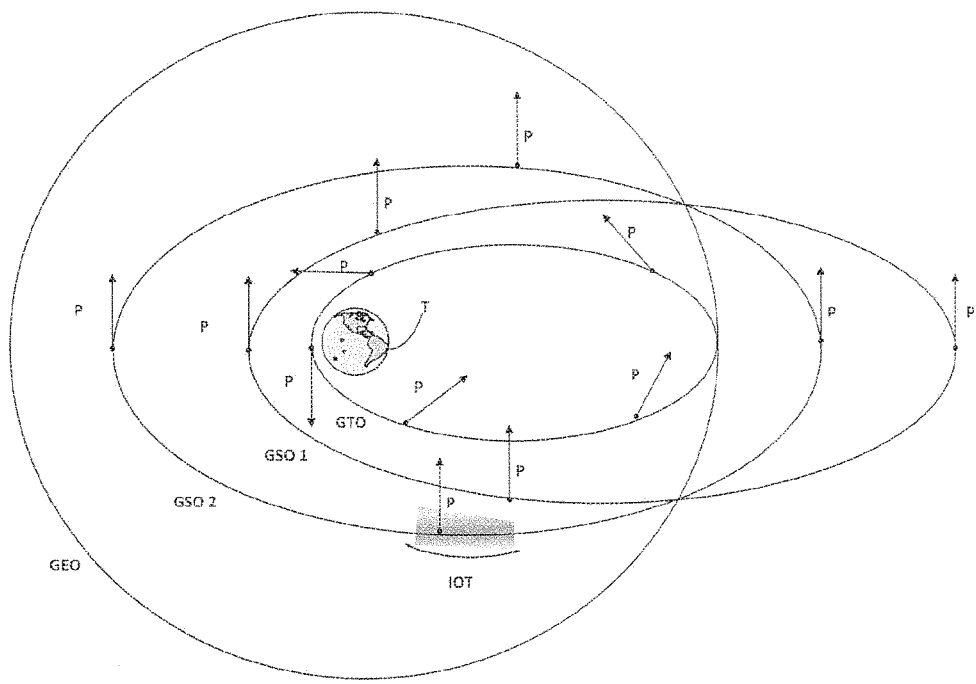
FIG. 1, certain orbits of the trajectory of a satellite according to one embodiment of the invention, in polar view.

A launcher (not represented) injects a telecommunications satellite SAT onto a transfer orbit OT, highly elliptical and preferably inclined relative to the equatorial plane EQ, typically with an inclination of between 6° and 30°. It can for example be a geostationary transfer orbit (GTO) with a perigee at an altitude of 290 km, an apogee at an altitude of 36,000 km and an inclination of 28°. In FIG. 1, the satellite SAT travels on its orbit in the anti-clockwise direction.

One or more electric motors, known per se, generate a continuous and low intensity thrust, which progressively deforms the orbit. Hereinbelow, "continuous" thrust will be understood to mean a thrust which is exerted over at least one, and generally several, revolutions of the satellite, and each time over a significant fraction of an orbital period, for example 50% or more and preferably 75% or more (continuous thrust "by intervals"), unlike a pulsed thrust which is exerted over durations very much shorter than an orbital period.

In a first phase of the transfer, the thrust, identified by the reference P in FIG. 1, is oriented in such a way as to increase the altitude of the perigee and of the apogee, and consequently the orbital period. Advantageously, it tends also to reduce the inclination of the orbit. FIG. 1 shows only the component of the thrust in the plane of the orbit, responsible for increasing the altitude of the apogee and of the perigee. The off-plane component of the thrust, responsible for reducing the inclination, changes direction each time the equatorial plane is crossed.

The intensity of the thrust is typically between 0.25 N and 2 N, and notably between 0.5 N and 1 N.

Figure 2:
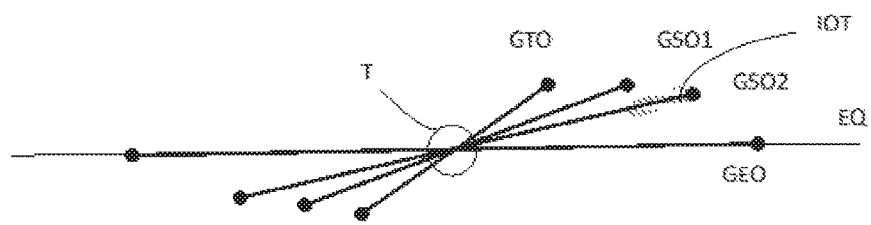
FIG. 2, the same orbits, as viewed in a plane perpendicular to the equatorial plane, and in a direction along the greater axis of the orbits.

At the end of a certain time, for example two months, the orbit becomes geosynchronous: its period is 24 hours, but, contrary to the case of a geostationary orbit, it is elliptical. Preferably, furthermore, this geosynchronous orbit—indicated by the reference GSO1 in FIGS. 1 and 2—exhibits a not-inconsiderable inclination (5° or more, typically between 5° and 20°). Preferably, the points at which the plane of this orbit crosses the equatorial plane correspond to the apogee and the perigee; in other words, its greater axis lies in the equatorial plane. In the example illustrated by the figures, the trajectory GSO1 exhibits a perigee at 10,000 km and an apogee at 60,000 km of altitude.

In a second phase of the transfer, the duration of which can also be approximately two months, the electrical propulsion acts in such a way as to lower the apogee of the satellite and raise its perigee, so as to render the orbit more circular, while keeping the duration of its period equal to 24 hours; preferably, furthermore, it reduces the inclination of the orbit. At the end of the transfer, the satellite is on geostationary orbit, that is to say an orbit that is geosynchronous, circular and of zero inclination. In the figures, the reference GEO indicates the geostationary orbit and GSO2 indicates a geosynchronous orbit obtained at an intermediate stage of the transfer.

According to the invention, the IOTs are performed during said second transfer phase, and more particularly corresponding to a portion of the orbit which is intermediate between the apogee and the perigee (in the figures, the reference "IOT" identifies the portion of the orbit GSO2 during which the tests are performed). At this point, the satellite is furthest away from the equatorial plane, which makes it possible to minimize the interferences with the operational geostationary satellites. For these interferences to remain at an acceptable level, it is preferable for the inclination of the orbit to be greater than or equal to typically 5°; generally, there is no need for this inclination to exceed 20°.

Figure 3:
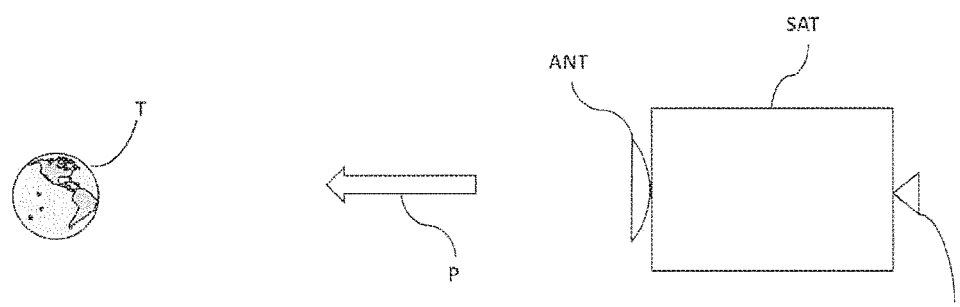
FIG. 3, the orientation of the thrust of a satellite during a portion of intermediate orbit between the apogee and the perigee.
Figure 4:
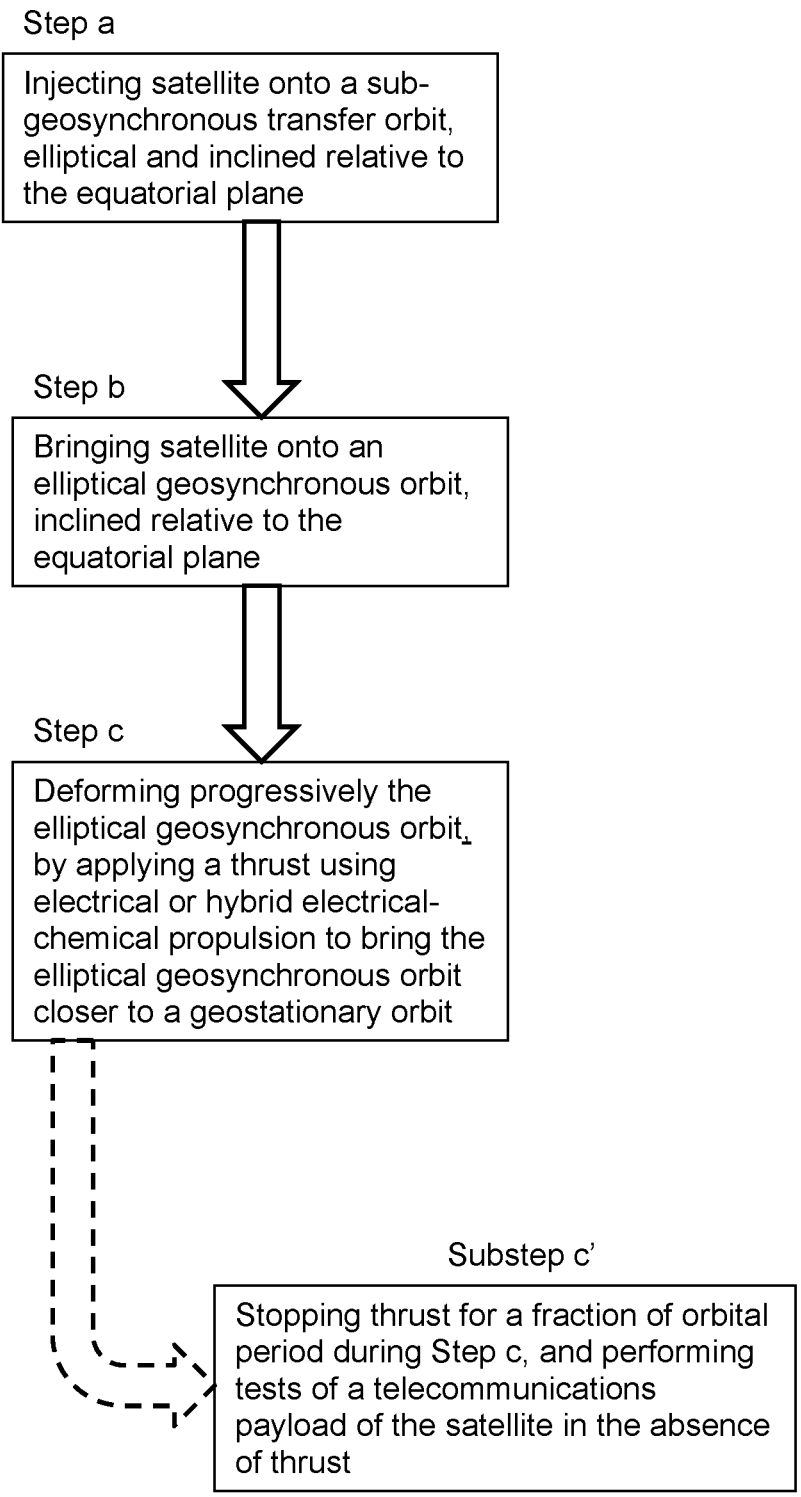
FIG. 4, showing the steps of the method for stationing a satellite according to one embodiment of the invention.

It can readily be appreciated that, during the second transfer phase, the thrust—or at least its projection onto the equatorial plane EQ—keeps a virtually constant orientation in an inertial reference frame centred on the earth T. Of the two points of the orbit which exhibit the highest distance relative to the equatorial plane, one corresponds to an orientation of the thrust which is approximately directed toward the earth (see FIG. 3). This point will preferentially be chosen to perform the IOTs; in effect, given that the telecommunications antennas ANT are generally arranged opposite the nozzles TME of the electric motors, this configuration minimizes the satellite reorientation manoeuvres required to establish a radio link with the ground.

In general, during the IOTs it is necessary to be able to finely modify the orientation of the satellite, for example to perform a scan making it possible to characterize the transmission pattern of an antenna. For this reason, it is preferable to stop the propulsion during the IOTs. This stoppage can last, for example, three hours for each 24 hour orbital period, and has the effect of increasing the duration of the second transfer phase. It can be verified, however, that the parts of the orbit situated at mid-path between the apogee and the perigee which, as explained above, are the best suited to the IOTs, are also those where the thrust is least effective, and therefore where a temporary stoppage of said thrust is least detrimental.

According to the prior art, the IOTs comprise both measurement periods and test preparation and analysis periods. The measurement periods last approximately 5 hours per day, distributed over two rotations involving two teams working 2 times eight hours (2×8); the overall duration of an IOT campaign is typically two weeks.

According to the invention, by contrast, the IOTs are performed over a longer period, but fewer hours per day—for example 3 consecutive measurement hours per day for a month. However, they are conducted "in concurrent operation time", during the transfer, which ultimately makes it possible to reduce the satellite commissioning delay. Furthermore, the fact that the IOTs are run only for a few consecutive hours per day and at fixed times, makes it possible to involve only a single team of testers instead of two, which reduces the costs.

The invention can be applied equally to the case of a satellite with all-electrical propulsion and to that of a satellite with hybrid chemical-electrical propulsion.

The invention claimed is:

1. A method for stationing a satellite, the method comprising:
   a transfer step performed by deforming progressively an elliptical geosynchronous orbit, on which said satellite moves, through a series of intermediate geosynchronous orbits, by applying a thrust using electrical or hybrid electrical-chemical propulsion on a revolution of the satellite along each of said series of intermediate geosynchronous orbits to bring said elliptical geosynchronous orbit closer to a geostationary orbit,
   wherein said transfer step comprises a substep of, during at least a plurality of revolutions of the satellite along said series of intermediate geosynchronous orbits, stopping said thrust for a fraction of orbital period and performing tests of a telecommunications payload of said satellite in the absence of thrust.

2. The method of claim 1, comprising the following steps:
   a) injecting said satellite onto a sub-geosynchronous transfer orbit, elliptical and inclined relative to an equatorial plane;
   b) bringing said satellite onto said elliptical geosynchronous orbit, inclined relative to said equatorial plane; and then
   c) said transfer step, including said substep of, during at least part of said plurality of revolutions of the satellite along said elliptical geosynchronous orbit, stopping said thrust for a fraction of orbital period and performing tests of a telecommunications payload of said satellite in the absence of thrust.

3. The method of claim 2 wherein said sub-geosynchronous transfer orbit is a geostationary transfer orbit.

4. The method of claim 2 wherein said step b) is performed by applying a thrust suitable for increasing the altitude of the apogee and of the perigee of the elliptical geosynchronous orbit of said satellite.

5. The method of claim 2 wherein said elliptical geosynchronous orbit has a greater axis on said equatorial plane and wherein said substep of stopping said thrust for a fraction of orbital period and performing tests of a telecommunications payload of said satellite in the absence of thrust is performed in a plurality of fractions of orbital period during which the satellite is furthest away from said equatorial plane.

6. The method of claim 2 wherein said thrust suitable for progressively bringing said inclined elliptical geosynchronous orbit closer to a geostationary orbit increases the altitude of its perigee and lowers that of its apogee.

7. The method of claim 2 wherein said thrust suitable for progressively bringing said inclined elliptical geosynchronous orbit closer to a geostationary orbit progressively reduces the inclination of its orbit relative to said equatorial plane.

8. The method of claim 2 wherein, during said substep of, during at least part of said plurality of revolutions of the satellite along said elliptical geosynchronous orbit, stopping said thrust for a fraction of orbital period and performing tests of a telecommunications payload of said satellite in the absence of thrust, said satellite moves on a geosynchronous orbit exhibiting an inclination of at least 5° relative to said equatorial plane.

9. The method according to claim 2, also comprising the following step, carried out after said transfer step c):
   d) positioning said satellite on said geostationary orbit.

10. The method according to claim 1, in which said satellite is a telecommunications satellite with all-electrical propulsion or with hybrid chemical-electrical propulsion.

* * * * *